Oct. 17, 1967  M. SANDERS  3,348,044
AIR SAMPLING METHOD AND APPARATUS
Filed Jan. 29, 1965

INVENTOR.
Merwyn Sanders
BY
*Roland G. Anderson*
ATTORNEY.

United States Patent Office 3,348,044
Patented Oct. 17, 1967

3,348,044
AIR SAMPLING METHOD AND APPARATUS
Merwyn Sanders, Knoxville, Tenn., assignor to the United States of America as represented by the United States Atomic Energy Commission
Filed Jan. 29, 1965, Ser. No. 429,186
3 Claims. (Cl. 250—83)

ABSTRACT OF THE DISCLOSURE

A method and apparatus for correlating the collection of samples at different times and places on separate filter papers with the display of data from analysis of such samples is described. The filter papers are placed in the apertures of precoded data processing cards for sampling. During sampling, the cards are placed in special holders to keep the paper taut. The cards are removed, the analyses performed, the results automatically punched onto the cards, the cards are duplicated, and the cards are tabulated to provide a data display.

This invention relates generally to the measurement of airborne contamination, and more specifically to an improved method and apparatus for measuring such contamination through the use of samples obtained by drawing air known or suspected of bearing entrained particulates through filter paper.

A common method of measuring airborne contamination involves pulling a quantity of the air being tested through a piece of filter paper and then determining the amount of particulate matter deposited on the paper. The filter paper however, is not readily marked with identifying information nor is it easily processed by automatic processing equipment. The rapid identification and processing of samples is highly desirable where large numbers of such samples must be taken and analyzed daily. Any difficulty encountered in identifying and processing filter paper samples lessens the desirability of collecting samples in this manner as it increases the cost and to some extent decreases the reliability of the meaurement due to sample mixup and proper identification.

It is, accordingly, a general object of the invention to provide a method and apparatus for readily identifying and processing airborne contamination samples gathered on filter paper.

Another object of the invention is to provide an improved method and apparatus for collecting airborne contamination samples whereby the sample may be directly and automatically processed.

Other objects of the invention will become apparent to those skilled in the art from an examination of the following description of the invention and the appended drawings, wherein.

In accordance with the present invention, an improved method and apparatus is provided for collecting and measuring airborne contamination. A piece of filter paper is mounted over an aperture in a data processing card which is precoded with identifying information. The card is placed in a holder having opposed and mating resilient grasping members which hold the filter paper in a taut condition while air is drawn through it. After the sampling operation, the card is removed from the holder and analyzed with automatic data processing equipment which records the analytical results directly on the card.

Figure 1:
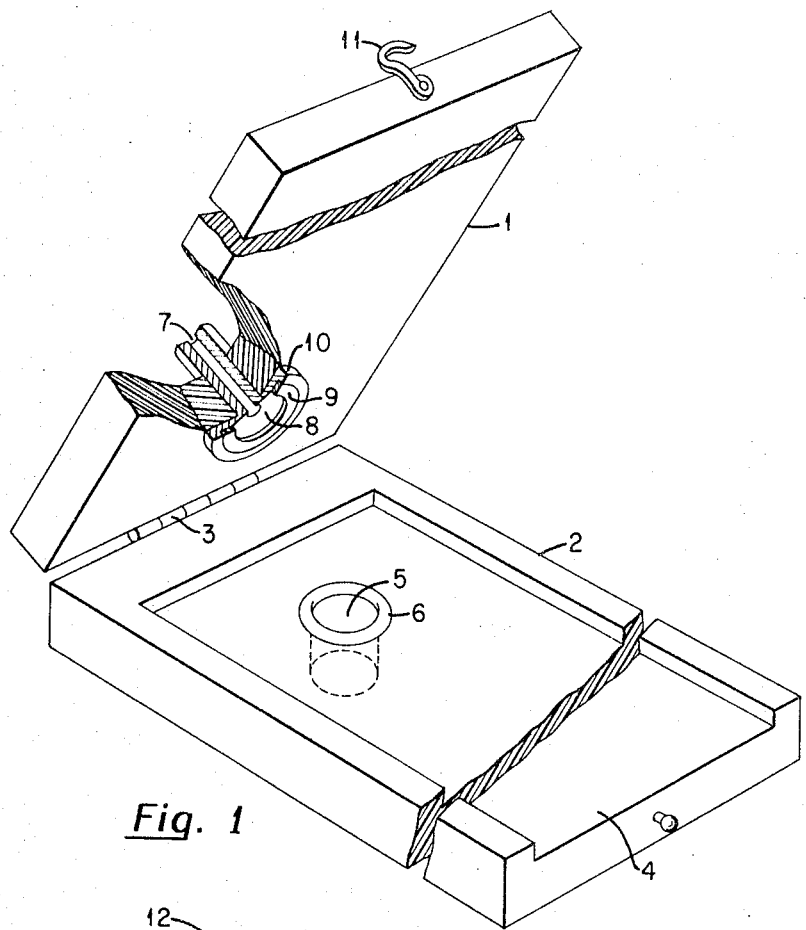
FIG. 1 is a isometric view in reduced scale of a holding device constructed according to the present invention for retaining a data procesing card during an air sampling operation.

To facilitate an understanding of the invention, reference is first made to FIG. 1 of the accompanying drawings. In FIG. 1 a card holder is shown comprising two generally elongated members 1 and 2 hinged together at one end by a piano hinge 3. Bottom member 2 is provided with a slot 4 extending essentially throughout its length with the general configuration of a standard data processing card. Near the hinged end of member 2 and within slot 4 is a circular opening 5 extending from slot 4 through member 2. That end of opening 5 communicating with slot 4 has its periphery bounded by a resilient rubber O-ring 6 which lies on top of the surface of slot 4.

Within the top member 1 and in register with opening 5 of bottom member 2 when members 1 and 2 are in the closed position, is provided a plug 10 extending through member 1. Plug 10 is centrally bored to provide a passage way 7 through member 1. That end of plug 10 adjacent member 2 (when members 1 and 2 are in the closed position) is provided with a concave surface 8 having substantially the same diameter as opening 5. The periphery of surface 8 is provided with a semi-rigid flat ring 9 which registers with O-ring 6 when the two members 1 and 2 are closed.

A latch 11 is provided for securing the members 1 and 2 in the closed position during a sampling operation.

Figure 2:
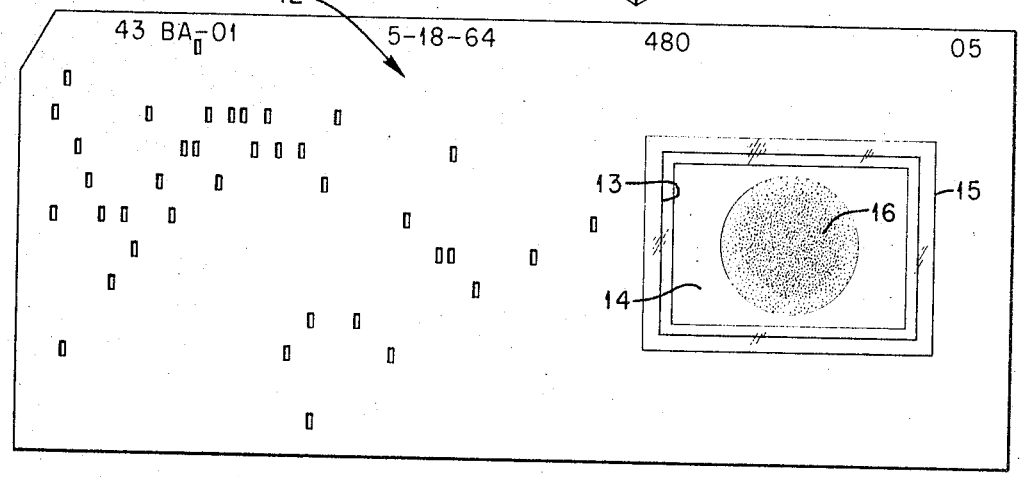
FIG. 2 is a plan view of a filter-paper-containing data processing card used with the holding device of FIG. 1.

A data processing card 12, for use with the holder of FIG. 1, is illustrated in FIG. 2. The card, with identifying information written thereon to aid in its placement for a sampling operation, contains a rectangular aperture 13 with a filter paper insert 14 held in place by a cellophane tape framework 15. A suitable filter paper for air sampling operations is Watman No. 41, manufactured by W & R Bolston Ltd., England. The darkened circular area 16 on insert 14 is caused by particulate matter collected by the filter paper during a sampling operation.

Example

In a typical air sampling operation employing the invention described herein, a data processing card of the type shown in FIG. 2 is precoded with identifying information and inserted into slot 4 of the holding device shown in FIG. 1. A suitable data processing card is the MMM–5062 "Filmsort" brand aperture card made by the Minnesota Mining and Manufacturing Company. The holding device is connected by means by plug 7 to a source of vacuum such as a portable vacuum pump. Aperture 13 containing filter paper 14 is placed over O-ring 6, the top member 1 lowered against the positioned card 12, and latch 11 secured. The filter paper 14 is thus grasped between O-ring 6 and semi-rigid flat ring 9. The grasping feature prevents dish-like deformations from occurring in the filter paper due to the pressure differential across it during a sampling operation. This feature is of critical importance to the successful operation of the invention as any deformation of the filter paper tends to disrupt or prevent automatic processing of the data processing card.

In the present embodiment, the filter paper 14 in card 12 is pulled taut when the members 1 and 2 are brought together. Proper operation in this regard requires that O-ring 6 be made of resilient rubber which grasps the filter as it expands outwardly under the pressure applied by the downwardly moving flat ring 9. A flat plastic ring may be substituted for hard rubber ring member 9 with satisfactory results.

With the filter paper securely positioned between the closed halves of the holding device of FIG. 1, and with the holding device connected to a vacuum source, an air sample is pulled through the filter paper, by means of the vacuum, for a predetermined length of time. During the time of the passage of the air through the filter paper, dust particles and the like are extracted from the air and deposited on the filter paper. This collected sample, integral with the data processing card, is then taken from the device and transferred to an analytical laboratory where the card is processed through automatic analytical equipment such as a Densitron, manufactured by Welch Scientific Company, and the results keypunched directly into the sample bearing data processing card. The Densitron, which measures light transmissability through the collection area 15 of the filter paper, is used where it is desired to measure the amount of all kinds of particulate matter in the air such as where smog or smoke is being measured. Typically, the cards are then passed through a second processing machine such as an IBM 519 reproducer which duplicates each card with a second uncontaminated card more amenable to processing through other automated equipment. The final product of the processing is a printed report indicating sample locations, time, and amount of contamination. In the case where airborne radioactive contamination is being measured, automatic processing equipment like that described in U.S. Patent No. 3,277,301 of common assignee may be used. Where non-radioactive contamination is being measured, the processing equipment would be similar to that in the above-referenced application except that the radiation detector thereon would be replaced by a light transmissability measuring device such as the above-referenced Densitron.

Where radioactive contamination is being measured, it is important that the data processing card be placed face downward in slot 4. This causes the sample to be collected by the filter paper on the face side of the card. Since, during processing, the radiation detector normally is positioned on one side of the card only (the face side), the sample must be on the same side of the card in order that extremely short range radiation can reach the detector. In this regard, it is noted that the thickness of the filter paper alone is sufficient to stop alpha particles emitted from most radioactive materials.

The above description of one form of the invention was offered for illustrative purposes only, and should not be interpreted in a limiting sense. It is intended that the invention be limited only by the claims appended hereto.

What is claimed is:
1. A method for correlating the collection of samples collected at different times and places on separate filter papers with the display of data derived from the automatic analysis of such samples comprising the steps of:
    (a) mounting each of said filter paper within an aperture in a corresponding data processing card;
    (b) precoding said cards with information identifying the time and place of sampling;
    (c) mounting said cards within holders to maintain said filter paper in a taut condition;
    (d) drawing gaseous samples through said filter papers to collect a separate particulate matter sample in each card aperture;
    (e) moving said cards from their holders to an automatic analyzer for analysis;
    (f) keypunching said cards to indicate the results of said analysis;
    (g) duplicating said cards in uncontaminated form; and
    (h) tabulating said uncontaminated cards in a computer to provide therefrom a display of correlated sample locations, times, and analysis of particulate matter.

2. A device for the collection of a particulate sample from a gaseous atmosphere comprising in combination: a data processing card containing an aperture, filter paper mounted within said aperture, a card holding member having a top portion and a bottom portion hinged together at one end, said bottom portion having a longitudinal slot for receiving said data processing card, said slot being of substantially the same width and length as said data processing card, said bottom portion having a circular opening extending therethrough, said circular opening being located below said filter paper when said data processing card is inserted in said slot, a resilient rubber O-ring lying on the surface of said slot about said circular opening, a centrally bored plug disposed within and extending through said top portion, the end of said plug adjacent said bottom portion having a concave surface of substantially the same diameter as said circular opening in said bottom portion, and a semi-rigid flat ring disposed about with concave surface, said flat ring being in register with said O-ring when said top and bottom portions are in a closed position.

3. The apparatus of claim 2 wherein said flat ring comprises hard rubber.

References Cited
UNITED STATES PATENTS 3,109,096 10/1963 Spaa _____ 250—83.6 X
3,195,257 7/1965 Weihe _____ 235—61.12 X ARCHIE R. BORCHELT, *Primary Examiner.*